United States Patent
Wildermuth et al.

(10) Patent No.: US 11,481,883 B2
(45) Date of Patent: Oct. 25, 2022

(54) SYSTEM FOR MONITORING A SWITCHGEAR

(71) Applicant: ABB Schweiz AG, Baden (CH)

(72) Inventors: Stephan Wildermuth, Laudenbach (DE); Aydin Boyaci, Karlsruhe (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/158,036

(22) Filed: Jan. 26, 2021

(65) Prior Publication Data
US 2021/0233219 A1    Jul. 29, 2021

(30) Foreign Application Priority Data

Jan. 29, 2020  (EP) ..................... 20154319

(51) Int. Cl.
*G06T 5/50* (2006.01)
*G06T 7/33* (2017.01)
(Continued)

(52) U.S. Cl.
CPC .............. *G06T 5/50* (2013.01); *G06K 9/6289* (2013.01); *G06T 7/33* (2017.01); *G06V 20/52* (2022.01); *H04N 5/247* (2013.01); *H04N 5/265* (2013.01); *G06T 2207/10048* (2013.01); *G06T 2207/30232* (2013.01)

(58) Field of Classification Search
CPC ......... G06T 7/0008; G06T 2207/30164; G06T 2207/10048
See application file for complete search history.

(56) References Cited

U.S. PATENT DOCUMENTS

| | | | |
|---|---|---|---|
| 7,538,326 B2* | 5/2009 | Johnson | G01J 5/0265 250/370.08 |
| 9,774,797 B2* | 9/2017 | Richards | H04N 5/33 |

(Continued)

FOREIGN PATENT DOCUMENTS

| | | |
|---|---|---|
| CN | 107767374 A | 3/2018 |
| JP | 3210706 U | 6/2017 |

OTHER PUBLICATIONS

Roger Schmidt : "How Patent-Pending Technology Blends Thermal And Visible Light", URL:https://www.fluke.com/en/learn/blog/thermal-imaging/how-patent-pending-technology-blends-thermal-and-visible-light, Jun. 20, 2013, Fluke, pp. 5-7,USA.

*Primary Examiner* — Boubacar Abdou Tchoussou
(74) *Attorney, Agent, or Firm* — Leydig, Voit & Mayer, Ltd.

(57) ABSTRACT

A system for monitoring a switchgear includes: an infrared camera for acquiring an infrared image of a switchgear; a visible camera for acquiring a visible image of the switchgear; a processing unit; and an output unit. The processing unit maps a plurality of pixels in the visible image to a plurality of pixels in the infrared image. The plurality of pixels in the visible image includes a plurality of sub-sets of pixels, each sub-set including at least one pixel. Each sub-set of pixels in the visible image is mapped to a corresponding pixel in the infrared image. Each sub-set of pixels in the visible image and the corresponding pixel in the infrared image relates to image data of a same part of the switchgear. The processing unit determines a combined image from the plurality of pixels in the visible image mapped to the plurality of pixels in the infrared image.

12 Claims, 3 Drawing Sheets

(51) Int. Cl.
*G06K 9/62* (2022.01)
*H04N 5/247* (2006.01)
*H04N 5/265* (2006.01)
*G06V 20/52* (2022.01)

(56) References Cited

U.S. PATENT DOCUMENTS

| | | | |
|---|---|---|---|
| 10,841,508 B2* | 11/2020 | Scanlon | H04N 5/247 |
| 10,972,649 B2* | 4/2021 | Casey | B60R 11/04 |
| 2006/0289772 A1* | 12/2006 | Johnson | H01L 27/14625 |
| | | | 250/370.08 |
| 2015/0296146 A1* | 10/2015 | Scanlon | H04N 5/247 |
| | | | 348/82 |
| 2015/0304612 A1* | 10/2015 | Richards | H04N 5/33 |
| | | | 348/159 |
| 2018/0054573 A1 | 2/2018 | Handley | |
| 2020/0275011 A1* | 8/2020 | Casey | H02G 1/02 |

* cited by examiner

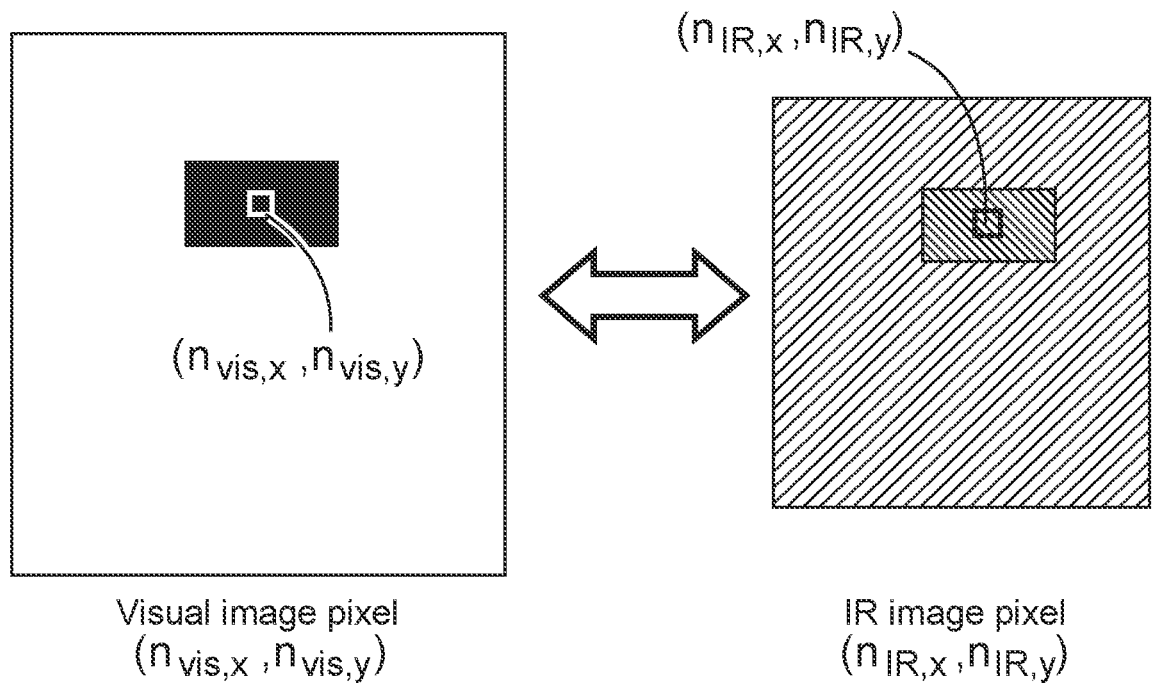

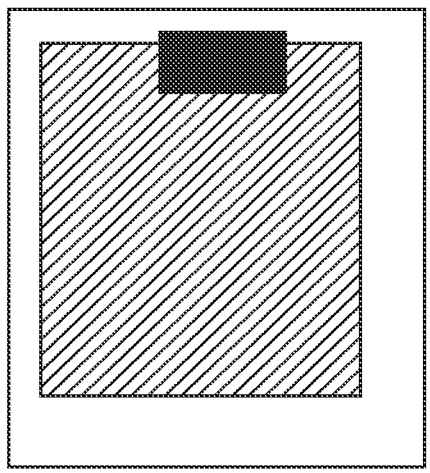
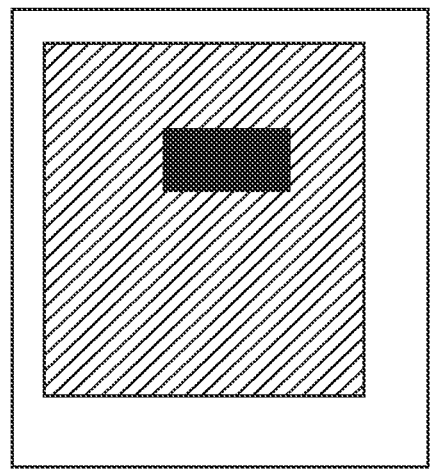
Fig. 5 a)  Fig. 5 b)
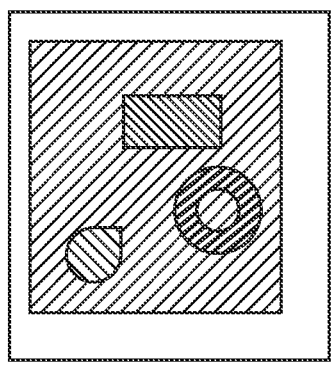
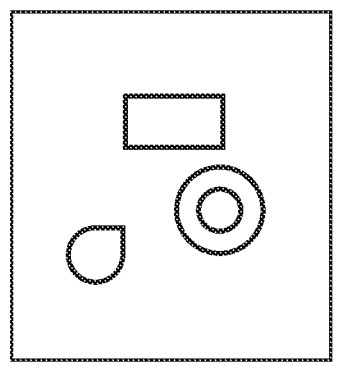
Fig. 6 a)  Fig. 6 b)
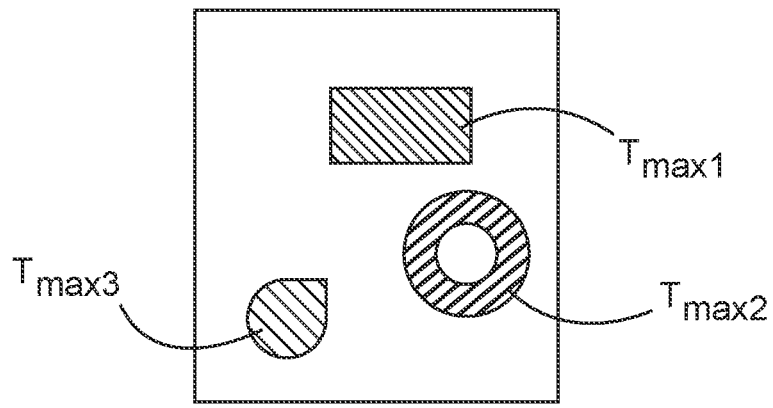
Fig. 7

SYSTEM FOR MONITORING A SWITCHGEAR

CROSS-REFERENCE TO PRIOR APPLICATION

Priority is claimed to European Patent Application No. EP 20154319.6, filed on Jan. 29, 2020, the entire disclosure of which is hereby incorporated by reference herein.

FIELD

The present invention relates to a system for monitoring a switchgear.

BACKGROUND

Infrared (IR) thermography is widely used for contactless temperature sensing and represents a convenient solution for a permanent installation of online temperature monitoring of electrical assets such as switchgears. The temperature extraction from thermal images of IR cameras supports the detection of critical hot spots to prevent overheating in switchgears.

Today, the application of stand-alone IR cameras brings the following drawbacks to existing and new solutions of electrical assets:

[1] Especially in unknown electrical assets, the proper installation of the IR camera is quite cumbersome for the purpose of commissioning and retrofit. The thermal image does not provide the information if all relevant components of the electrical asset are fully captured by the IR camera. This is in particular the case in the cold state of the switchgear if cost efficient IR cameras with low spatial resolution as well as low sensitivity are used. In this situation internal components can only be detected reliably after the switchgear becomes heated up.

[2] Individual components of the electrical asset and possible further objects such as forgotten tools are hard to recognize only from the thermal IR image. The recognition of components and objects is essential to detect the type of failure and which phases are affected.

[3] With regard to switchgears, the type, topology and the compartment are hard to identify only from the thermal IR image.

[4] Low-resolution cameras make [1]-[3] even more difficult. In the thermal image, the contour lines of the measured temperatures, representing the boundary lines of the object, become less sharp.

There is a need to address these issues.

SUMMARY

In an embodiment, the present invention provides a system for monitoring a switchgear, the system comprising: an infrared camera configured to acquire an infrared image of a switchgear; a visible camera configured to acquire a visible image of the switchgear; a processing unit; and an output unit, wherein the processing unit is configured to map a plurality of pixels in the visible image to a plurality of pixels in the infrared image, the plurality of pixels in the visible image comprising a plurality of sub-sets of pixels with each sub-set comprising at least one pixel, each sub-set of pixels in the visible image being mapped to a corresponding pixel in the infrared image, and each sub-set of pixels in the visible image and the corresponding pixel in the infrared image relating to image data of a same part of the switchgear, wherein the processing unit is configured to determine a combined image comprising utilization of the plurality of pixels in the visible image mapped to the plurality of pixels in the infrared image, and wherein the output unit is configured to output the combined image.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 2a, FIG. 2b and FIG. 2c show an example of an image mapping workflow;

FIG. 3 shows an example of application of the image mapping workflow;

FIG. 4 shows an example of an excerpt from a mapping table;

FIG. 5a and FIG. 5b show examples of combined image data;

FIG. 6a and FIG. 6b show an example of a thermal infrared image at a) with a corresponding visual image at b), where objects detected in the visible image of mapped onto a combined infrared and visible image enabling infrared image data of the objects to be extracted; and FIG. 7 shows an example of temperature feature extraction.

DETAILED DESCRIPTION

Figure 1:
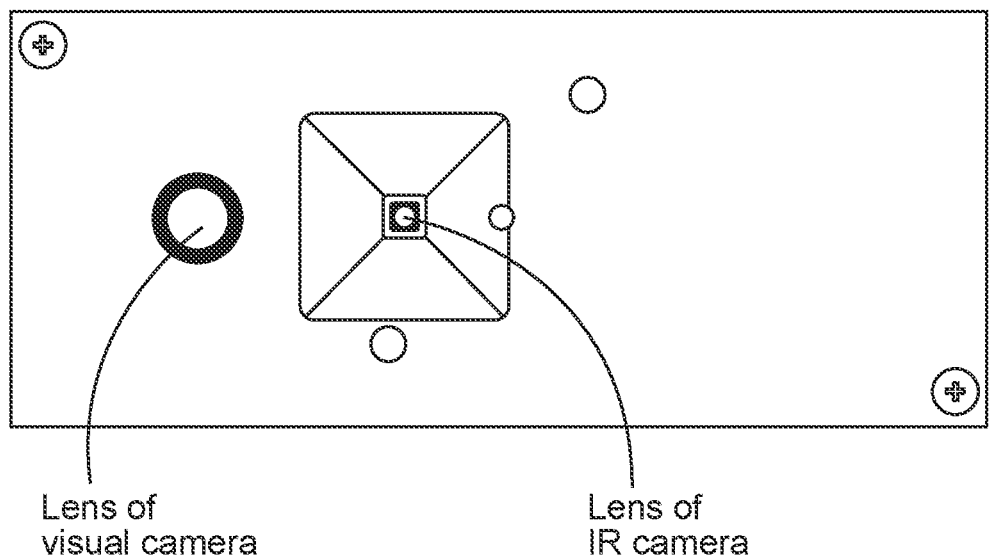
FIG. 1 shows an example of a system for monitoring a switchgear.

In an embodiment, the present invention provides an improved system for monitoring a switchgear.

It is to be noted that the system is described with respect to a switchgear, but finds utility in other electrical systems than can suffer from components that overheat.

In an aspect, there is provided a system for monitoring a switchgear, the system comprising:

an infrared camera;
a visible camera;
a processing unit; and
an output unit.

The infrared camera is configured to acquire an infrared image of a switchgear. The visible camera is configured to acquire a visible image of the switchgear. The processing unit is configured to map a plurality of pixels in the visible image to a plurality of pixels in the infrared image. The plurality of pixels in the visible image comprises a plurality of sub-sets of pixels with each sub-set comprising at least one pixel. Each sub-set of pixels in the visible image is mapped to a corresponding pixel in the infrared image, and each sub-set of pixels in the visible image and the corresponding pixel in the infrared image relate to image data of the same part of the switchgear. The processing unit is configured to determine a combined image comprising utilization of the plurality of pixels in the visible image mapped to the plurality of pixels in the infrared image. The output unit is configured to output the combined image.

In other words, a temperature monitoring system for a switchgear uses an infrared image and a visible image, where the infrared image can be at a lower resolution than the visible image, where the fields of view of the cameras overlap in that they are imaging at least some of the same objects. A combined image is provided from these two images that provides feature recognition capabilities associated with the visible image with temperature information coming from the infrared image.

In an example, the infrared camera and visible camera are housed within a same housing.

In an example, the housing is configured to be mounted to and dismounted from the switchgear.

In an example, a lens of the infrared camera is located adjacent to a lens of the visible camera.

In an example, the processing unit is configured to utilize a field of view of the visible camera and a field of view of the infrared camera to map the plurality of pixels in the visible image to the plurality of pixels in the infrared image.

In an example, the field of view of the visible camera at least partially overlaps the field of view of the infrared camera.

In an example, the processing unit is configured to utilize a field of line of sight of the visible camera and a line of sight of the infrared camera to map the plurality of pixels in the visible image to the plurality of pixels in the infrared image.

Here, line of sight can refer to a field of view of a camera, thus knowing the fields of view of the cameras in terms of the area of space they are imaging, pixel mapping can be undertaken. However, line of sight can also mean a centre line of an optical axis of the camera—in other words the direction an optical axis of the camera is pointing. Then, knowing this information pixel mapping can be undertaken, where use can be made of camera specification information such as an angular range of imaging.

Pixel mapping can involve assigning the pixels of the visual image to the pixels of the IR image or vice versa, where use can be made of a mapping table. Such a mapping table can be used to give the temperature of every pixel of the visual image in the region overlapping with the IR camera image and is then universally applicable for the selected types of cameras.

Pixel mapping can also involve assigning pixels of the visible image the color representing the temperature from the thermal image, where use can again be made of a mapping table.

In an example, the processing unit is configured to utilize a distance between a detector of the visible camera and a detector of the infrared camera to map the plurality of pixels in the visible image to the plurality of pixels in the infrared image.

Thus, knowing a lateral distance between the visible and infrared cameras, for example a lateral distance between centres of their detectors then the overlapping parts of their images can be determined. For example, the cameras can be offset from one another, but pointed in a parallel direction, but with knowledge of the angular field of view of the two cameras it can be determined which pixels of the visible image correspond to which pixels of the infrared image in terms of imaging the same part of an object. Similarly, if the two cameras are offset laterally, but angles to one another again with knowledge of the angular fields of view of the cameras the pixels are be correlated one with the other. Even, if the two cameras are offset from one another, with one slightly in front of the other, then the lateral distance and the forward distance can be ustilized with triangulation and the angular field of view in order to correlate pixels one with the other.

In an example, the processing unit is configured to utilize a mapping table to map the plurality of pixels in the visible image to the plurality of pixels in the infrared image.

In an example, the processing unit is configured to detect at least one part of the switchgear, the detection comprising utilization of an object recognition algorithm by the processing unit to process the combined image.

In an example, the processing unit is configured to detect one or more objects that are not part of the switchgear, the detection comprising utilization of the object recognition algorithm by the processing unit to process the combined image.

In an example, detection of the one or more part of the switchgear comprises utilization by the processing unit of input from a user identifying at least one feature of the switchgear.

In an example, the at least one feature of the switchgear comprises a topology and/or compartment and/or phase of the switchgear.

In an example, the processing unit is configured to assign at least one temperature to the at least one detected part of the switchgear comprising utilization of the infrared image.

In an example, a resolution of the infrared camera is less than a resolution of the visible camera.

The above aspects and examples will become apparent from and be elucidated with reference to the embodiments described hereinafter.

FIGS. 1-7 relate to a system for monitoring a switchgear. According to an example, the system comprises an infrared camera, a visible camera, a processing unit, and an output unit. The infrared camera is configured to acquire an infrared image of a switchgear. The visible camera is configured to acquire a visible image of the switchgear. The processing unit is configured to map a plurality of pixels in the visible image to a plurality of pixels in the infrared image. The plurality of pixels in the visible image comprises a plurality of sub-sets of pixels with each sub-set comprising at least one pixel. Each sub-set of pixels in the visible image is mapped to a corresponding pixel in the infrared image, and each sub-set of pixels in the visible image and the corresponding pixel in the infrared image relate to image data of the same part of the switchgear. The processing unit is configured to determine a combined image comprising utilization of the plurality of pixels in the visible image mapped to the plurality of pixels in the infrared image. The output unit is configured to output the combined image.

According to an example, the infrared camera and visible camera are housed within a same housing.

According an example, the housing is configured to be mounted to and dismounted from the switchgear.

According an example, a lens of the infrared camera is located adjacent to a lens of the visible camera.

According an example, the processing unit is configured to utilize a field of view of the visible camera and a field of view of the infrared camera to map the plurality of pixels in the visible image to the plurality of pixels in the infrared image.

According an example, the field of view of the visible camera at least partially overlaps the field of view of the infrared camera.

According an example, the processing unit is configured to utilize a field of line of sight of the visible camera and a line of sight of the infrared camera to map the plurality of pixels in the visible image to the plurality of pixels in the infrared image.

According an example, the processing unit is configured to utilize a distance between a detector of the visible camera and a detector of the infrared camera to map the plurality of pixels in the visible image to the plurality of pixels in the infrared image.

According an example, the processing unit is configured to utilize a mapping table to map the plurality of pixels in the visible image to the plurality of pixels in the infrared image.

According an example, the processing unit is configured to detect at least one part of the switchgear, the detection comprising utilization of an object recognition algorithm by the processing unit to process the combined image.

According an example, the processing unit is configured to detect one or more objects that are not part of the switchgear, the detection comprising utilization of the object recognition algorithm by the processing unit to process the combined image.

According an example, detection of the one or more part of the switchgear comprises utilization by the processing unit of input from a user identifying at least one feature of the switchgear.

According an example, the at least one feature of the switchgear comprises a topology and/or compartment and/or phase of the switchgear.

According an example, the processing unit is configured to assign at least one temperature to the at least one detected part of the switchgear comprising utilization of the infrared image.

According an example, a resolution of the infrared camera is less than a resolution of the visible camera.

Thus, a switchgear or other electrical equipment can have installed in association with it the above described system.

Thus the system is a dual camera system with an IR camera and a visual camera with a mapping procedure for the temperature monitoring of electrical assets. The dual camera system comprises a specially designed housing in which both an IR camera and a visual camera are installed. The lenses of both cameras should keep a minimal distance to each other to maximize the overlap of the IR and visual images. Taking into account this distance and the fields of view of both cameras and what they are viewing in a calibration step, a mapping procedure is derived to obtain an enhanced thermal image which represents the detail-accurate overlay of the thermal on the visible light image. The enhanced thermal image enables component to be recognised in the electrical asset, and the temperatures of these regions of interest can be shown. Temperature features of those regions of interest can easily be extracted for condition monitoring, such as maximal/minimal, average and environment temperature.

Continuing with the figures, the system for monitoring a switchgear is described in further detail, with respect to specific embodiments.

FIG. 1 shows an exemplar design of a dual camera housing within which are installed in infrared camera and a visual camera, with FIG. 1 showing a front view. The dual camera housing is specially designed to place both cameras and to ensure a fixed minimal distance/offset of both lenses to each other. A further benefit of the housing is the possibility of a flexible fixation in the electrical asset. FIG. 1 shows one possible realization of the dual camera housing manufactured by 3D printing. As discussed above, the design has a strong focus on keeping a minimal distance between the two lenses of the infrared camera and visible camera.

Figures 2, 2A:
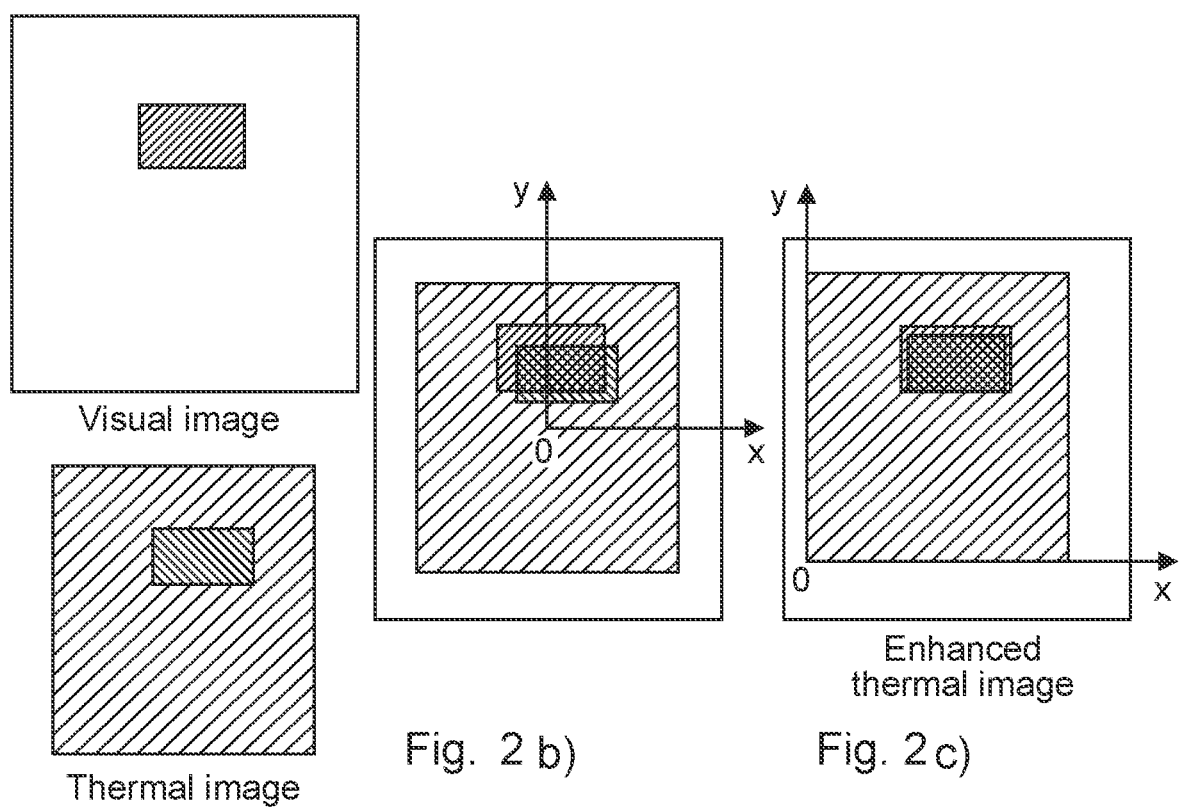

FIG. 2: shows an example of an image mapping method: At a) are shown separate visual and thermal images showing a black rectangular object which is heated up. At b) is shown an overlay of the visual and thermal images by defining the origin of both local coordinate systems (x, y) exactly in the middle of the image. At c) is shown a transformation to a common coordinate system (X, Y) resulting in an enhanced thermal image which is a detail-accurate overlay of both images. The development of a mapping method provides the detail-accurate overlay of both images resulting in an enhanced thermal image. A mapping table is generated to assign the pixels of the visual image to the pixels of the IR image or vice versa. The mapping table gives the temperature of every pixel of the visual image in the region overlapping with the IR camera image and is universally applicable for the selected types of cameras.

FIG. 3: shows an illustrative representation of detecting the corresponding pixels in both images by applying the image mapping method.

FIG. 4: shows an excerpt of a mapping table. It is to be noted that usually the visual image has a much higher resolution than the thermal image. Therefore, several pixels of the visual image are assigned to the same pixel of the IR image.

Thus, FIGS. 2-4 in effect represent a calibration step, where FIG. 2 outlines the mapping method developed to provide the detail-accurate overlay of the thermal on the visible light image, where the local coordinate systems of both images are transformed to a common coordinate system considering the fields of view and camera offset. FIG. 3 then shows the schematics of how a visual image pixel is assigned to an IR image pixel and vice versa, with an exemplary mapping table shown in FIG. 4.

FIG. 5 shows examples of enhanced thermal images, where a black rectangular object is of interest having about the same temperature as environment: at a) the black object is not fully captured by the thermal IR image, whilst at b) the black object is fully captured by the thermal IR image. Thus, FIG. 5 outlines how an enhanced thermal image can support during commissioning the placement of the camera in a correct position so that all relevant components are fully captured. Especially, if the electrical asset is not in operation, all components have about the same temperature. Thus, the thermal image does not give any additional information if the temperature of the components or phases in total is to be monitored. The commissioning of even unknown electrical assets is therefore easy to handle since the enhanced thermal image provides the information if all relevant components are fully captured. This is also a benefit for retrofit applications.

FIG. 6 shows an example of the definition of regions of interest: At a) an enhanced thermal image is shown with three different objects of interest. At b) the detection of pixels capturing the objects of interest in the visual image (left) and determining the corresponding IR image pixels by the mapping table in the thermal image (right) is shown.

The type, topology and compartment of switchgears can be identified by the user from the enhanced thermal image. Alternatively, an object recognition algorithm can be used for automatic identification. The automatic identification of type, topology and compartment as well as components makes use of an object recognition algorithms which use image processing methods. The regions of interest are defined by the user and/or automatically by critical components or phases which can be arbitrary geometrical 2D objects in the visual image, shown schematically in FIG. 6. The corresponding IR pixels are derived by the mapping table to obtain the temperature information for the regions of interest.

FIG. 7 shows an example of temperature feature extraction. The maximal temperature is determined for the three defined regions of interest. Alternatively, further temperature characteristics can be extracted, for instance minimal and average temperature, but also the environment temperature if the corresponding region is defined in the visual image. Thus, temperature features can be easily extracted for the regions of interest, e.g. maximal/minimal, average and environment temperature. It is to be noted that the system can use a low spatial resolution IR camera, e.g. 32×32 pixels, in combination with a higher spatial resolution visual light camera (e.g. USB camera with 480×640 resolution) both are which are cost-effective.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A system for monitoring a switchgear, the system comprising:
    an infrared camera configured to acquire an infrared image of a switchgear;
    a visible camera configured to acquire a visible image of the switchgear;
    a processing unit; and
    an output unit,
    wherein a resolution of the infrared camera is less than a resolution of the visible camera,
    wherein the processing unit is configured to map a plurality of pixels in the visible image to a plurality of pixels in the infrared image and utilize a field of view of the visible camera and a field of view of the infrared camera to map the plurality of pixels in the visible image to the plurality of pixels in the infrared image, wherein the field of view of the visible camera at least partially overlaps the field of view of the infrared camera, the plurality of pixels in the visible image comprising a plurality of sub-sets of pixels with each sub-set comprising at least two pixels, each sub-set of pixels in the visible image being mapped to a corresponding pixel in the infrared image, and each sub-set of pixels in the visible image and the corresponding pixel in the infrared image relating to image data of a same part of the switchgear,
    wherein the processing unit is configured to determine a combined image comprising utilization of the plurality of pixels in the visible image mapped to the plurality of pixels in the infrared image, and
    wherein the output unit is configured to output the combined image.

2. The system according to claim 1, wherein the infrared camera and visible camera are housed within a same housing.

3. The system according to claim 2, wherein the housing is configured to be mounted to and dismounted from the switchgear.

4. The system according to claim 1, wherein a lens of the infrared camera is located adjacent to a lens of the visible camera.

5. The system according to claim 1, wherein the processing unit is configured to utilize a line of sight of the visible camera and a line of sight of the infrared camera to map the plurality of pixels in the visible image to the plurality of pixels in the infrared image.

6. The system according to claim 1, wherein the processing unit is configured to utilize a distance between a detector of the visible camera and a detector of the infrared camera to map the plurality of pixels in the visible image to the plurality of pixels in the infrared image.

7. The system according to claim 1, wherein the processing unit is configured to utilize a mapping table to map the plurality of pixels in the visible image to the plurality of pixels in the infrared image.

8. The system according to claim 1, wherein the processing unit is configured to detect at least one part of the switchgear as a first detection, the first detection comprising utilization of an object recognition algorithm by the processing unit to process the combined image.

9. The system according to claim 8, wherein the processing unit is configured to detect one or more objects that are not part of the switchgear as a second detection, the second detection comprising utilization of the object recognition algorithm by the processing unit to process the combined image.

10. The system according to claim 8, wherein detection of the at least one part of the switchgear comprises utilization by the processing unit of input from a user identifying at least one feature of the switchgear.

11. The system according to claim 10, wherein the at least one feature of the switchgear comprises a topology and/or compartment and/or phase of the switchgear.

12. The system according to claim 8, wherein the processing unit is configured to assign at least one temperature to the at least one part of the switchgear comprising utilization of the infrared image.

* * * * *